Feb. 25, 1969                R. E. SWANSON                3,429,549
                    METERING DEVICE FOR FLEXIBLE TUBES
                         Filed Nov. 22, 1966

INVENTOR.
REINOLD E. SWANSON
BY  *Salter & Michaelson*

ATTORNEYS

United States Patent Office 3,429,549
Patented Feb. 25, 1969

3,429,549
METERING DEVICE FOR FLEXIBLE TUBES
Reinold E. Swanson, Rehoboth, Mass., assignor to Davol Rubber Company, Providence, R.I., a corporation of Rhode Island
Filed Nov. 22, 1966, Ser. No. 596,194
U.S. Cl. 251—4                                    8 Claims
Int. Cl. F16l 55/14; F16g 11/02

ABSTRACT OF THE DISCLOSURE

The present invention relates generally to a metering device and more particularly to a device adapted to be used for controlling the rate of flow through a flexible tubing. This invention is of particular value for surgical uses, such as flow controlling the rate of intravenous feeding and the like.

---

A primary object of the instant invention is the provision of a metering device of the general character above-described wherein the rate of flow of a fluid through a flexible tubing may be regulated and controlled from a fully open to a completely shut-off position and at any desired intermediate rate of flow.

Another object is a provision of a metering device of the character described wherein the flexible tubing passes through the metering device in such a way that the tubing and metering device form a unit thus ensuring that the means for metering the flow of fluid through the tubing is always present.

A further object is the provision of a metering device of the character described that may be slidably moved along the flexible tubing so that the metering device may be located at any desired position on the flexible tubing.

A further object is the provision of a metering device of the character described that is extremely easy to manipulate and that is provided with calibrations so as to visually indicate the position of adjustment of the device.

Still another object is the provision of a metering device of the character described that is effective for tubings of various diameters.

A further object is the provision of a device of the character described that is relatively simple and economically feasible to manufacture since it comprises only two separate parts, and since the assembly involves the use of no adhesives or the like.

It has been found that the foregoing objectives can be effectively accomplished by providing a device comprising two separable body members, each having a bore extending therethrough. The two members are adapted to be releasably interlocked to each other with their bores in axial alignment and with their adjacent faces in spaced relation with respect to each other. The bore extending through each of the body members is initially of circular configuration but then flattens out so that a flexible tubing passing through the two body members will also be flattened out, although not occluded. The connection between the two body members is such that they may be rotated with respect to each other, it being understood that when the body members are so rotated, the flattened portion of the tubing will gradually twist so as to reduce the rate of fluid flow through the tubing until the twist of the tubing is sufficient to completely block flow therethrough.

Other objects, features and advantages of the invention will become apparent as the description thereof proceeds when considered in connection with the accompanying illustrative drawings.

In the drawings which illustrate the best mode presently contemplated for carrying out the present invention:

Figure 1:
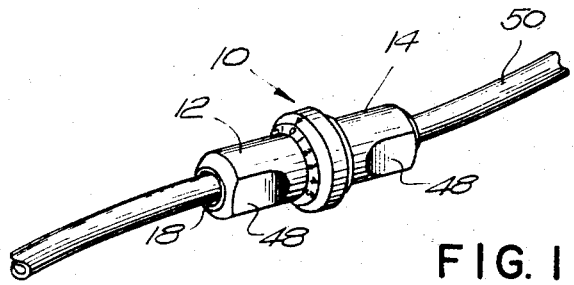
FIG. 1 is a perspective view of a metering device constructed in accordance with the instant invention.

Referring now to the drawings, there is shown generally at 10 a metering device comprising first and second body members 12 and 14. The body members 12 and 14 may be constructed of any desired material, although a plastic material such as polypropylene, nylon or the like is preferred, since such material readily lends itself to molding of the members 12 and 14.

Figure 2:
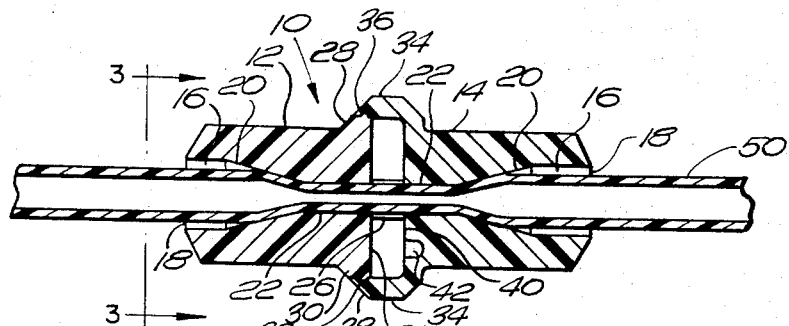
FIG. 2 is an enlarged sectional view of the assembly shown in FIG. 1.

As will be seen most clearly in FIGS. 1 and 2, the members 12 and 14 are each of generally cylindrical configuration and each have a bore 16 extending axially therethrough. It is important to note that the bore 16 is of generally circular configuration at its outer end portions 18, but the circular configuration gradually flattens as at 20 until the bore assumes a flattened or generally oblong configuration as shown at 22. As will be seen most clearly in FIGS. 4 and 5, the long dimension of the oblong bore 22 is substantially equal to the diameter of circular bore 18.

Figure 4:
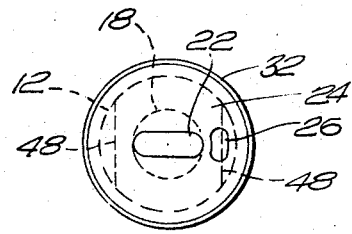
FIG. 4 is an end view of the inner face of one of the body members that form a part of my invention.
Figure 5:
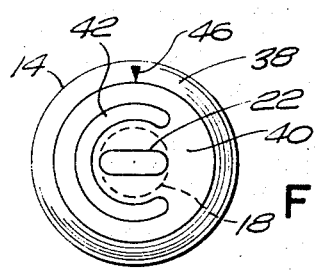
FIG. 5 is an end view of the inner face of the other body member that forms a part of my invention.

As will be seen most clearly in FIGS. 2 and 4, the inner end face 24 of body member 12 is provided with an axially extending lug 26, the purpose of which will hereinafter become apparent. It will also be noted that adjacent the end surface 24 the body member 12 is provided with an outwardly inclined annular shoulder 28 defining an enlarged peripheral portion 30. On the outer surface of the enlarged peripheral portion 30 there is provided a marginal bead 32 extending completely around peripheral portion 30, as most clearly shown in FIG. 4.

The other body member, namely, body member 14, is provided with an axially extending peripheral skirt 34 adapted to telescopingly receive peripheral portion 30 of body member 12, as most clearly shown in FIG. 2. An annular groove 36 extends around the inner surface of skirt 34 and is adapted to snap-receive the marginal bead 32 so as to releasably interlock the body members 12 and 14. It will be noted that the leading edge of skirt 34 is beveled as at 38 whereupon when the body members 12 and 14 are interengaged as illustrated in FIG. 2, the inclined surface 28 of body member 12 and the bevel 38 of body member 14 form a smooth, flush continuation of each other.

The end inner face 40 of body member 14 is provided with an arcuate channel 42, which channel receives therein the lug 26 when the body members 12 and 14 are interengaged as illustrated in FIG. 2. It will be understood that when the body members 12 and 14 are interengaged, they are free to rotate with respect to each other within the limits defined by channel 42. Expressed differently, when lug 26 reaches one of the ends of channel 42, further relative rotations between the members 12 and 14 is prevented. It is important to note that when the body members 12 and 14 are interengaged as illustrated in FIG. 2, the end faces 24 and 40 are substantially spaced from each other.

Figure 3:
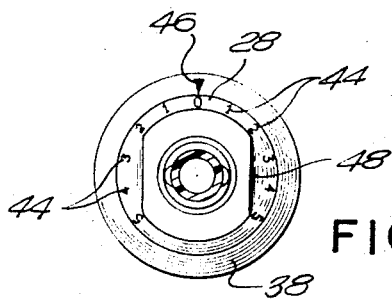
FIG. 3 is a section taken on line 3—3 of FIG. 2.

The inclined shoulder 28 of body member 12 is provided with suitable indicia or calibrations, as shown at 44 in FIG. 3, said calibrations cooperating with an indicator, such as an arrowhead 46 provided on the beveled surface 38 of body member 14. It will be understood that when indicator 46 registers with the "zero" calibration of body member 12, the body members are relatively positioned with respect to each other so that the oblong bore portion 22 of each body member is in registry. As the body members 12 and 14 are rotated with respect to each other, the indicator 46 will give a reading corresponding to a certain degree of rotary displacement between said body members.

It will be understood that when the body members 12 and 14 are interengaged, they may be rotated with respect to each other within the limits allowed by lug 26 and arcuate channel 42. The interengagement of the members 12 and 14 is such that during relative rotation therebetween there is a sufficient frictional drag so that the members will remain in any desired position of relative rotation. In order to facilitate relative turning of the members 12 and 14, suitable gripping means may be provided thereon, such as flat portions 48.

In operation and use, a flexible tube 50 is passed through bore 16 in device 10 as most clearly illustrated in FIGS. 1 and 2. It will be understood that the tube 50 may be of any desired material, such as rubber or plastic, although it is essential that the tube be of the flexible variety. In order to assemble the device 10 with tubing 50, it is only necessary to pass a free end of the tubing through bore 16, it being obvious that the tubing may be of any outer diameter, so long as its outer diameter is not larger than the diameter of circular bore portion 18. With the body members 12 and 14 interengaged with each other as illustrated in FIG. 2, the device 10 may be slidably shifted along tube 50 to any desired location thereon. As hereinbefore explained, when indicator 46 registers with the "zero" marking on body member 12, the oblong bore portions 22 in members 12 and 14 are in registry with each other and hence maximum flow through tube 50 is permitted. When it is desired to reduce the rate of flow through tube 50, it is simply necessary to rotate body member 12 with respect to body member 14, it being understood that as these members rotate with respect to each other, the tube 50, and specifically that portion of the tube located between faces 24 and 40, will commence to twist, thus resulting in the desired reduction in rate of flow. The greater the rotary displacement between members 12 and 14, the greater the reduction in the rate of flow, until the members 12 and 14 have been rotary displaced with each other sufficiently so as to twist the tube 50 to the extent that the flow therethrough is completely blocked. It will be understood that the indicator 46 and calibrations 44 enable an operator to determine the rate of flow through tube 50 for any relative rotary positioning of the members 12 and 14.

It is essential that the faces 24 and 40 be spaced from each other a sufficient distance since otherwise turning movement of the body members 12 and 14 with respect to each other would tend to shear the tube 50. By the same token, it is necessary to limit the degree of rotation between the members 12 and 14, such as by lug 26 and channel 42, in order to prevent such extreme twisting of the tube 50 as might cause it to rip or tear.

Since the device 10 comprises only two parts, namely, the body members 12 and 14, and since these members may be inexpensively molded, and since assembly of these members to each other is a dry assembly involving nothing more than a snap-in connection between the members, it has been found that the cost of making and using the device 10 is so economically feasible that in practice, the device may be disposable after each use, particularly where the use is a hospital use. In spite of the simplicity and low cost of the device, however, an extremely accurate and positive control is provided, not only as a shut-off means, but also as a means for metering and controlling reduced rates of flow through flexible tubing.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A metering device for flexible tubes, comprising first and second body members each having a bore extending therethrough, means rotatably and frictionally connecting said body members to each other with the said bores in axial alignment and with the adjacent end faces of said body members in spaced relation to each other, said bores having a substantially oblong configuration in cross-section at their said adjacent ends.

2. The metering device of claim 1 further characterized in that said connecting means comprises an annular skirt extending axially from the said adjacent end of one of said members, an annular groove extending around the inner surface of said skirt, and an outwardly extending projection on said other body member, the adjacent end of said other body member being telescopingly received within said annular skirt with said projection making releasable interlocking engagement with said groove.

3. The metering device of claim 1 further characterized in that one of said body members has a lug extending axially from its said adjacent end face and an arcuate channel in the adjacent end face of said other body member, said lug extending into said channel so as to provide means for guiding and limiting the relative rotary movement of one body member with respect to the other, and to simultaneously provide means for maintaining said adjacent end faces in the aforesaid spaced relation to each other.

4. The metering means of claim 1 further characterized in that said bores are substantially circular in cross-section at their opposite ends in each body member, said circular bore portions gradually flattening to provide the aforesaid oblong configuration at the said adjacent ends of said body members.

5. The metering means of claim 2 further characterized in that said projection is a peripheral bead.

6. The metering means of claim 4 further characterized in that the diameter of said circular bore portion is substantially equal to the long dimension of said oblong configuration.

7. The metering means of claim 1 further characterized in that said body members are provided with calibrations to visually indicate the rotary displacement of one oblong bore with respect to the other.

8. The metering means of claim 1 further characterized in that said body members are each provided with gripping means for facilitating rotary turning of one body member wth respect to the other.

References Cited

UNITED STATES PATENTS

| 888,893 | 5/1908 | Hayes | 24—132 XR |
|---|---|---|---|
| 2,112,592 | 3/1938 | MacClatchie | 251—4 |
| 2,189,865 | 2/1940 | Petersen | 24—115.7 XR |
| 2,565,605 | 8/1951 | Grayson | 24—132 XR |
| 2,844,351 | 7/1958 | Smith | 251—4 |
| 3,371,906 | 3/1968 | Lubold | 251—4 |

ARNOLD ROSENTHAL, *Primary Examiner.*

U.S. Cl. X.R.

24—115, 132